(12) United States Patent
Lin et al.

(10) Patent No.: US 7,518,605 B2
(45) Date of Patent: Apr. 14, 2009

(54) MODE SUPPORT SYSTEMS AND METHODS

(75) Inventors: Mo-Hsuan Lin, Taoyuan (TW); Te-Wei Fu, Taipei (TW); Ping-Huei Hsieh, Taipei (TW)

(73) Assignee: Via Technologies, Inc., Taipei (TW)

( * ) Notice: Subject to any disclaimer, the term of this patent is extended or adjusted under 35 U.S.C. 154(b) by 463 days.

(21) Appl. No.: 11/299,520

(22) Filed: Dec. 12, 2005

(65) Prior Publication Data

US 2006/0218526 A1    Sep. 28, 2006

(30) Foreign Application Priority Data

Mar. 24, 2005    (TW) .............................. 94109088 A

(51) Int. Cl.
| | |
|---|---|
| *G06F 17/00* | (2006.01) |
| *G06F 13/00* | (2006.01) |
| *G06T 1/60* | (2006.01) |
| *G09G 5/02* | (2006.01) |
| *G09G 5/00* | (2006.01) |
| *G06F 9/00* | (2006.01) |
| *G06F 15/177* | (2006.01) |
| *G06F 9/44* | (2006.01) |

(52) U.S. Cl. .................. 345/418; 345/3.4; 345/530; 345/660; 345/698; 345/699; 713/2; 717/110; 717/111; 719/323

(58) Field of Classification Search ............... 345/418, 345/660, 698, 699, 3.3, 3.4; 719/321, 323
See application file for complete search history.

(56) References Cited

U.S. PATENT DOCUMENTS

| | | | | |
|---|---|---|---|---|
| 5,375,210 A | * | 12/1994 | Monnes et al. .............. 710/10 |
| 5,418,962 A | * | 5/1995 | Bodin et al. ................. 710/8 |
| 5,581,788 A | * | 12/1996 | Ballare ........................ 710/14 |
| 5,926,166 A | * | 7/1999 | Khederzadeh et al. ....... 345/581 |
| 5,943,029 A | * | 8/1999 | Ross ............................ 345/11 |
| 5,949,437 A | * | 9/1999 | Clark .......................... 345/502 |
| 6,081,891 A | * | 6/2000 | Park ............................. 713/2 |
| 6,115,026 A | | 9/2000 | Spurlock |
| 6,308,248 B1 | * | 10/2001 | Welker et al. ............... 711/209 |
| 6,487,656 B1 | * | 11/2002 | Kim et al. .................... 713/2 |
| 6,697,033 B1 | * | 2/2004 | Leung et al. ................. 345/5 |
| 6,753,881 B1 | * | 6/2004 | Callway et al. ............. 345/699 |
| 6,791,572 B1 | * | 9/2004 | Cloney et al. ............... 345/619 |
| 6,907,482 B2 | * | 6/2005 | Maciesowicz ............... 710/63 |
| 6,909,406 B2 | * | 6/2005 | Wilburn et al. .............. 345/3.1 |
| 7,007,159 B2 | * | 2/2006 | Wyatt ........................... 713/1 |
| 7,079,128 B2 | * | 7/2006 | Kim ............................ 345/213 |
| 7,129,909 B1 | * | 10/2006 | Dong et al. .................. 345/1.1 |

(Continued)

FOREIGN PATENT DOCUMENTS

CN    1573689    2/2005

*Primary Examiner*—Ulka Chauhan
*Assistant Examiner*—Roberta Prendergast
(74) *Attorney, Agent, or Firm*—Thomas, Kayden, Horstemeyer & Risley

(57) ABSTRACT

Mode support systems and methods. The system comprises a storage device and an editing unit. The storage device comprises a first mode list comprising a plurality of display modes. The editing unit edits at least one supported display mode from the display modes in the first mode list, and stores a second mode list comprising the supported display mode to the storage device. The supported display mode in the second mode list is retrieved by a device.

8 Claims, 3 Drawing Sheets

U.S. PATENT DOCUMENTS

| | | | |
|---|---|---|---|
| 7,158,154 B2 * | 1/2007 | Kim et al. | 345/649 |
| 2002/0135584 A1 * | 9/2002 | Lee | 345/531 |
| 2002/0135605 A1 * | 9/2002 | Kim | 345/698 |
| 2003/0174161 A1 * | 9/2003 | Wilburn et al. | 345/730 |
| 2005/0235221 A1 * | 10/2005 | Asoh et al. | 715/789 |

* cited by examiner

111

| 0 | 640×480 |
| --- | --- |
| 1 | 800×600 |
| 2 | 1024×768 |
| 3 | 1280×1024 |
| 4 | 1400×1050 |
| 5 | 1600×1200 |

| 0 | 640×480 |
| --- | --- |
| 1 | 800×600 |
| 2 | 1024×768 |
| 3 | 1280×1024 |
| 4 | 1600×1200 |

FIG. 2B

MODE SUPPORT SYSTEMS AND METHODS

BACKGROUND

The invention relates to display mode management, and particularly to mode support systems and methods that dynamically edit supported display modes.

Generally, VBIOS (Video Basic Input/Output System) comprises several display modes to support display devices. To change a current display mode of a display device, a computer system can query and update a supported display mode from the VBIOS via an OS (Operating System) or a driver.

To remove specific display modes, additional program codes must be added to a driver to remove the specific display modes. However, if the computer system directly queries the supported display modes via the OS, but not through the driver, these specific display modes will appear, that will cause system inconsistency.

Alternatively, the VBIOS must be returned to the supplier for re-editing and compilation of the supported display modes. Since the delivery of VBIOS to the supplier is inconvenient and time-consuming, such conventional solution is impractical. Additionally, the combination of supported display modes is inflexible.

SUMMARY

Mode support systems and methods that dynamically edit supported display modes are provided.

An embodiment of a mode support system comprises a storage device and an editing unit. The storage device comprises a first mode list comprising a plurality of display modes. The editing module edits at least one supported display mode from the display modes in the first mode list, and stores a second mode list comprising the supported display mode to the storage device. The supported display mode in the second mode list is retrieved by a device.

An embodiment of a mode support system comprises a first mode list and a second mode list. The first mode list comprises a plurality of display modes. The second mode list comprises at least one supported display mode, in which the supported display mode is one of the display modes. The supported display mode in the second mode list is retrieved by a device.

An embodiment of a mode support system comprises a storage device and an OS. The storage device comprises a first mode list and a second mode list. The first mode list comprises a plurality of display modes, and the second mode list comprises at least one supported display mode, in which the supported display mode is one of the display modes. The supported display mode in the second mode list is retrieved by the OS.

In an embodiment of a mode support method, a first mode list is provided. The first mode- list comprises a plurality of display modes. A second mode list is provided. The second mode list comprises at least one supported display mode, in which the supported display mode is one of the display modes. The supported display mode is obtained by retrieving the second mode list.

Mode support systems and methods may take the form of program code embodied in tangible media. When the program code is loaded into and executed by a machine, the machine becomes an apparatus for practicing the disclosed method.

DESCRIPTION OF THE DRAWINGS

The aforementioned features and advantages will become apparent by referring to the following detailed description with reference to the accompanying drawings, wherein:

FIG. 2A is a schematic diagram illustrating an embodiment of a first mode list;

FIG. 2B is a schematic diagram illustrating an embodiment of a second mode list.

DESCRIPTION

Mode support systems and methods are provided.

Figure 1:
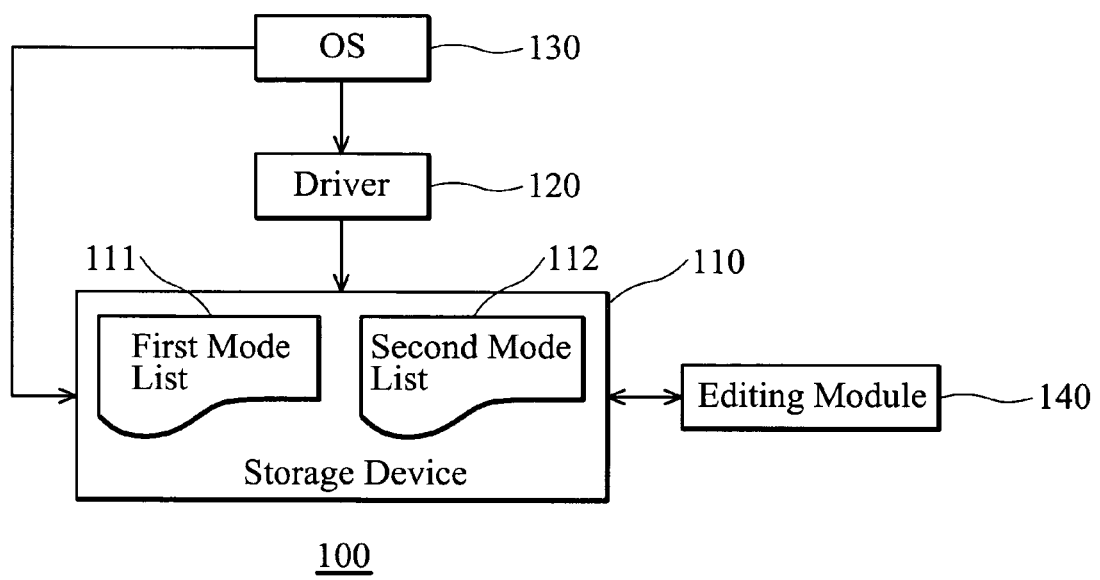
FIG. 1 is a schematic diagram illustrating an embodiment of a mode support system.

FIG. 1 is a schematic diagram illustrating an embodiment of a mode support system.

The mode support system 100 is suitable for use in a device such as a computer system. The mode support system 100 comprises a storage device 110, a driver 120 of the storage device 110, an OS 130 of the device, and an editing module 140.

The storage device 110 may be a VBIOS, comprising a first mode list 111 and a second mode list 112. The first mode list 111 records all display modes supported by the storage device 110. The second mode list 112 records display modes to be supported in the device. The editing module 140 can be implemented in hardware or software. The editing module 140 edits the second mode list 112, and stores the edited second mode list to the storage device 110. Additionally, the OS 130 can directly query supported display modes from the storage device 110, or via the driver 120. In response to the query, the storage device 110 returns the display modes in the second mode list 112 to the OS 130.

FIGS. 2A and 2B are schematic diagrams illustrating embodiments of a first mode list 111 and a second mode list 112, respectively. As shown, the first mode list 111 comprises six display modes, 640×480, 800×600, 1024×768, 1280×1024, 1400×1050, and 1600×1200. To cancel the display mode 1400×1050, the editing module 140 can be used to remove the display mode 1400×1050, thus generating the second mode list 112, and updating it to the storage device 110. It is understood that the first mode list is fixed, and cannot be modified. If the display modes are to be dynamically adjusted, they can be edited from the second mode list 112.

Figure 3:
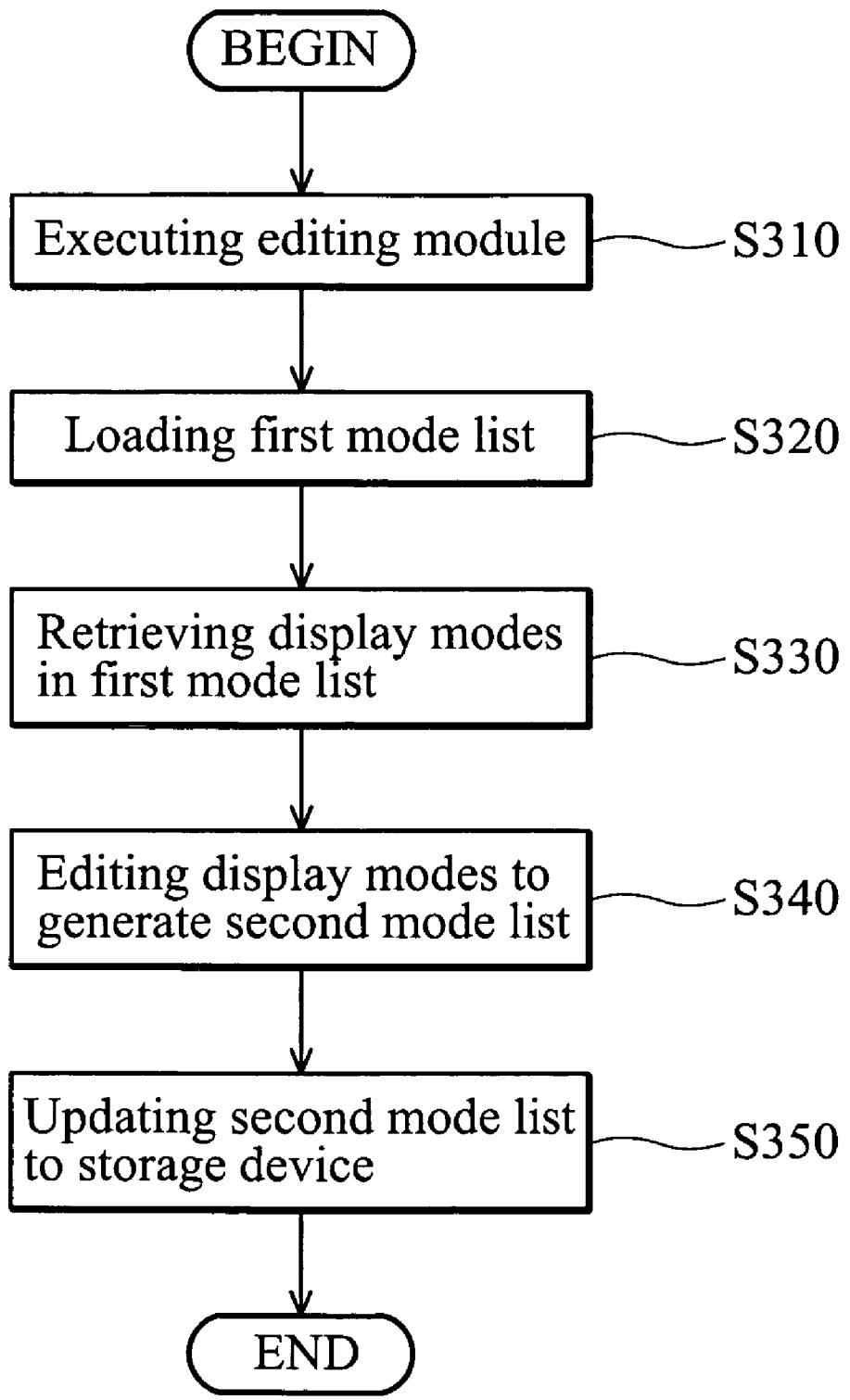
FIG. 3 is a flowchart of an embodiment of a mode support method.

FIG. 3 is a flowchart of an embodiment of a mode support method.

In step S310, the editing module 140 is initialized and executed. In step S320, the first mode list 111 is loaded from the storage device 110, and in step S330, all supported display modes are retrieved from the first mode list 111. In step S340, the display modes are edited to generate the second mode list 112. For example, one of the display modes can be deleted, such that the deleted display mode is not present in the second mode list 112. It is understood that, in some embodiments, the second mode list 112 can be loaded from the storage device 110, such that the current supported display modes are obtained and edited. In some embodiments, the first mode list 111 and the second mode list 112 can be simultaneously loaded from the storage device 110 for editing. In step S350, the edited second mode list 112 is updated to the storage device 110. To dynamically edit the second mode list 112, the flexibility of display mode combination can be improved.

Additionally, the query result of supported display modes from the storage device 110 directly using the OS 130 or via the driver 120 is consistent.

Mode support systems and methods, or certain aspects or portions thereof, may take the form of program code (i.e., executable instructions) embodied in tangible media, such as floppy diskettes, CD, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those skilled in this technology can still make various alterations and modifications without departing from the scope and spirit of this invention. Therefore, the scope of the present invention shall be defined and protected by the following claims and their equivalents.

What is claimed is:

1. A mode support system, comprising:
  a storage device VBIOS (Video Basic Input/Output System) storing a first mode list comprising a plurality of display modes;
  an editing unit editing at least one supported display mode from the display modes in the first mode list, and storing a second mode list comprising the supported display mode to the VBIOS;
  a driver of the VBIOS, retrieving the second mode list from the VBIOS, and obtaining the supported display mode in the second mode list; and
  an OS (Operating System) of a device, retrieving the second mode list directly from the VBIOS, and obtaining the supported display mode in the second mode list.

2. The system of claim 1 wherein the OS further retrieves the second mode list from the VBIOS by way of the driver, and obtains the supported display mode in the second mode list.

3. A mode support system, comprising:
  a storage device VBIOS (Video Basic Input/Output System) storing a first mode list and a second mode list, in which the first mode list comprises a plurality of display modes, and the second mode list comprises at least one supported display mode, the supported display mode is one of the display modes;
  a driver of the VBIOS, retrieving the second mode list from the VBIOS, and obtaining the supported display mode in the second mode list; and
  an OS (Operating System) retrieving the second mode list directly from the VBIOS, and obtaining the supported display mode in the second mode list.

4. The system of claim 3 further comprising a driver receiving a direction from the OS, and retrieving the second mode list in response thereto.

5. The system of claim 3 further comprising an editing module editing the supported display mode in the second mode list.

6. A mode support method, comprising:
  providing a first mode list comprising a plurality of display modes in a storage device VBIOS (Video Basic Input/Output System);
  providing a second mode list comprising at least one supported display mode in the VBIOS, in which the supported display mode is one of the display modes;
  a driver of the VBIOS retrieving the second mode list to obtain the supported Display mode; and
  an OS (Operating System) retrieving the second mode list directly from the VBIOS to obtain the supported display mode.

7. The method of claim 6 further comprising the OS retrieving the second mode list from the VBIOS by way of the driver, and obtaining the supported display mode in the second mode list.

8. The method of claim 6 further comprising editing the supported display mode in the second mode list.

* * * * *